United States Patent [19]

Adams

[11] 4,226,075
[45] Oct. 7, 1980

[54] FRUIT PICKING APPARATUS

[76] Inventor: George Adams, 383 N. Beckett Pl., Grover City, Calif. 93433

[21] Appl. No.: 13,877

[22] Filed: Feb. 22, 1979

[51] Int. Cl.³ .......................................... A01D 46/24
[52] U.S. Cl. ................................................... 56/337
[58] Field of Search ................. 56/333, 334, 335, 336, 56/337, 338, 339, 340

[56] References Cited

U.S. PATENT DOCUMENTS

| | | | |
|---|---|---|---|
| 252,129 | 1/1882 | Mustart | 56/336 |
| 620,195 | 2/1899 | Stewart | 56/335 |
| 1,191,954 | 7/1916 | Elkins | 56/336 |
| 1,307,417 | 6/1919 | Powers | 56/335 |
| 2,246,747 | 6/1941 | Metzger | 56/335 |
| 3,744,227 | 7/1973 | Kerner | 56/335 |
| 3,902,306 | 9/1975 | Rosenberg | 56/333 |

Primary Examiner—Robert A. Hafer
Attorney, Agent, or Firm—Jack C. Munro

[57] ABSTRACT

An apparatus for picking fruit from trees which takes the form of an elongated member which has a cutting blade arrangement at the upper end of the member and a handle structure at the lower end of the member for activating the cutting blade. Once the stem of the fruit has been severed, the fruit passes into a guide tube and hence into a flexible guide chute prior to being deposited into a container. The cutting blade assembly could take the form of a scissors type arrangement or could take the form of a rotating cylinder which passes over a fixed cutting blade with the fruit having been initially located within the cylinder.

1 Claim, 12 Drawing Figures

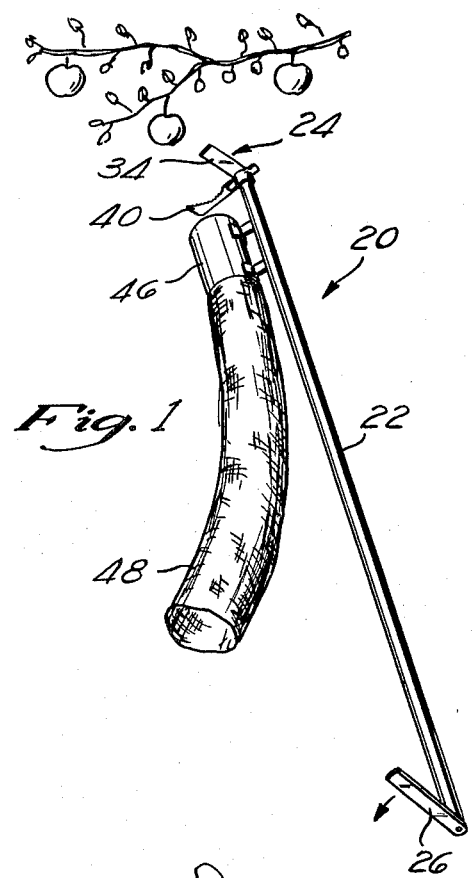
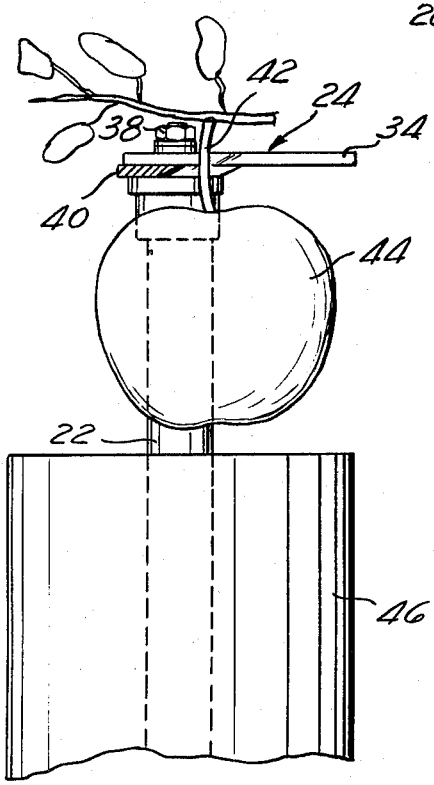
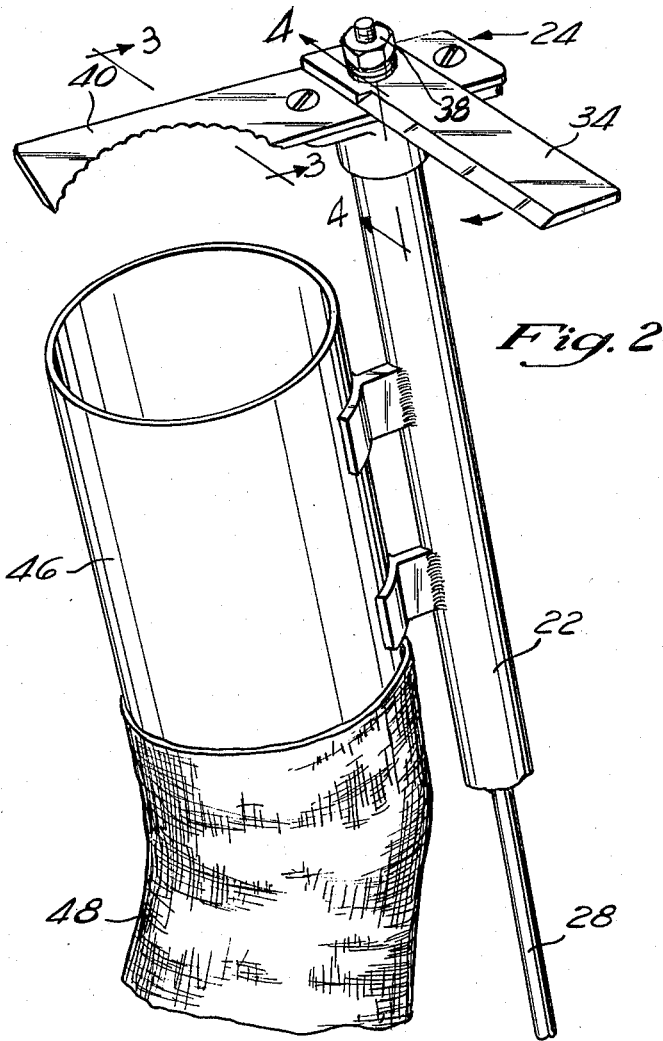
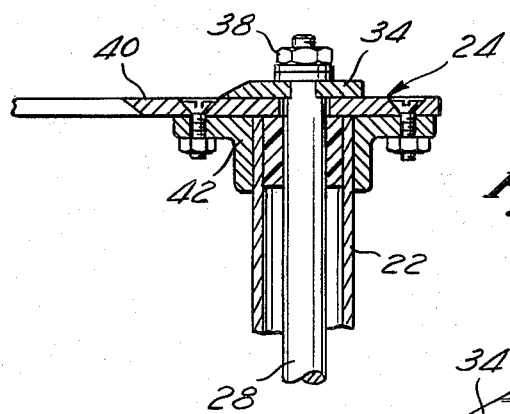
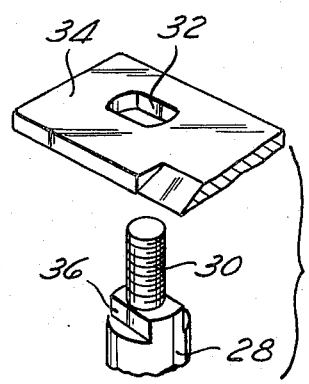

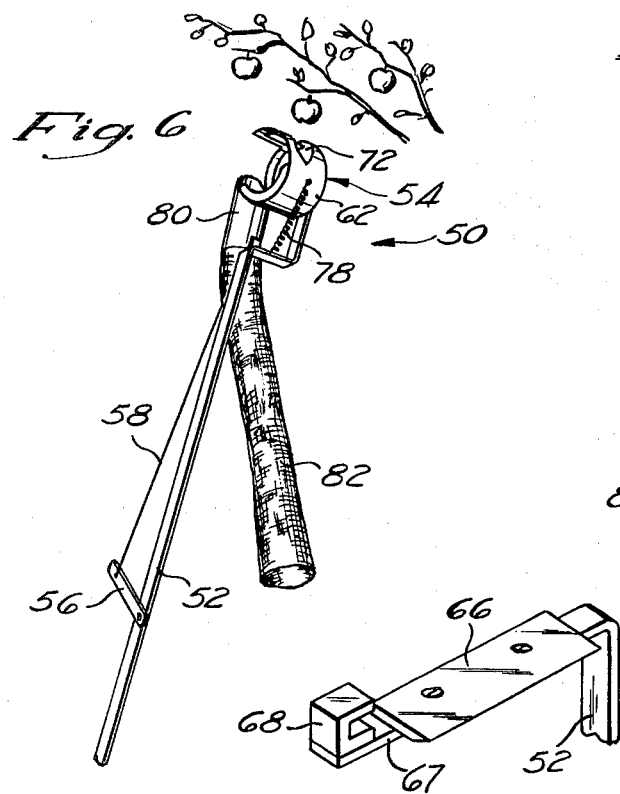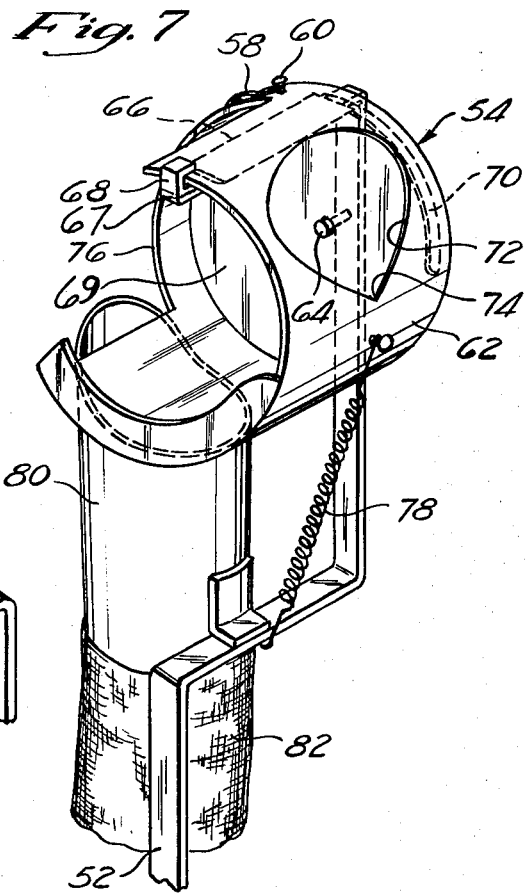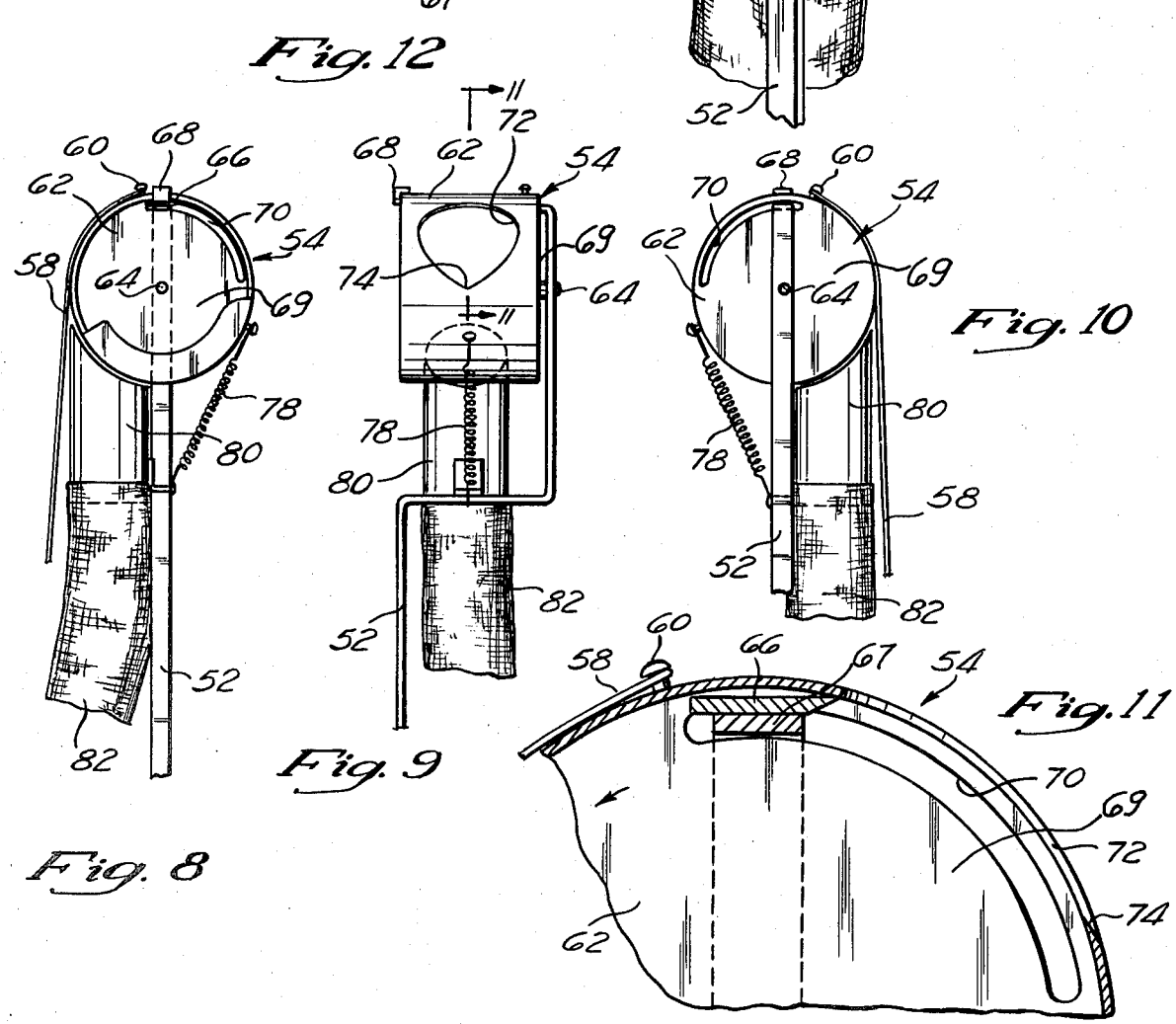

FRUIT PICKING APPARATUS

BACKGROUND OF THE INVENTION

The field of this invention relates to a device that facilitates the picking of fruit from trees and specifically the upper area of trees without requiring the use of any form of a ladder structure and also deposits the fruit within a container without causing bruising of the fruit.

The normal method of picking fruit from trees is accomplished by means of ladders in order to reach the higher areas of the tree. The use of a ladder is undesirable for several reasons. In the first place, a ladder is inherently unsafe as it is very easy for a person to fall on a ladder and injure himself. In the second place, to use the ladder requires moving the ladder frequently and walk up and down the ladder repeatedly. This is time consuming and therefore the fruit is not being picked in a most efficient manner.

It would be desirable to design some form of a fruit picking apparatus designed in particular for trees wherein the user can operate the device from the ground and thereby eliminate the use of a ladder. Additionally, the picking apparatus should operate quickly and easily and upon the fruit being removed from the tree, the fruit is conducted into a guide chute which prevents bruising of the fruit as it is being directed toward a storage container.

SUMMARY OF THE INVENTION

The structure of this invention is believed to be summarily described in the Abstract of the Disclosure and reference is to be had thereto.

The primary objective of this invention is to construct a device which quickly and easily removes fruit from the trees and causes the fruit to be located within a storage container with the fruit not being bruised or damaged.

A further advantage of this invention is that the apparatus is constructed of few parts and can be readily employed by even the most unskilled person.

A further advantage of this invention is that it can be constructed quite inexpensively and therefore can be sold at relatively low cost thereby increasing the possibility of its widespread use.

BRIEF DESCRIPTION OF THE DRAWING

FIG. 1 is a diagrammatic view illustrating the use of the first embodiment of the fruit picking apparatus of this invention;

FIG. 2 is an enlarged isometric view of the upper end of the first embodiment of the fruit picking apparatus of this invention showing the cutting blade assembly in the open position; and FIG. 3 is a partially in cross-section frontal view taken along line 3—3 of FIG. 2; showing the cutting blade assembly in the cutting position; and FIG. 4 is a cross-sectional view taken along line 4—4 of FIG. 2 showing the attachment of the cutting blade assembly within the first embodiment of the apparatus of this invention; and FIG. 5 is an exploded isometric view showing the connection between the movable cutting blade and its actuating member included within the first embodiment of the apparatus of this invention; and FIG. 6 is a diagrammatic view similar to FIG. 1 but of a second embodiment of the apparatus of this invention;

FIG. 7 is an enlarged isometric view of the upper end of the second embodiment of the fruit picking apparatus of this invention showing the apparatus in the open or non-cutting position; and FIG. 8 is a front view of the structure of FIG. 7;

FIG. 9 is a right side view of the structure of FIG. 7;

FIG. 10 is a left side view of the structure shown in FIG. 7;

FIG. 11 is an enlarged segmental cross-sectional view taken along line 11—11 of FIG. 9 diagramatically showing the cutting action of the second embodiment of this invention; and FIG. 12 is an enlarged isometric view of the fixed cutting blade located within the cutting blade assembly of the second embodiment of this invention.

DETAILED DESCRIPTION OF THE SHOWN EMBODIMENT

Referring particularly to the drawings, there is shown in FIG. 1 the first embodiment 20 of apparatus of this invention which basically has an elongated tubular member 22, a cutting blade assembly 24 and an actuating member 26. The cutting blade assembly 24 is located at the upper end of the member 22 with the actuating member 26 located at the lower end of the member 22.

The tubular member 22 is hollow and has extending therethrough a rod 28. The lower end of the rod 28 has the actuating member 26 fixedly secured thereto. The upper end of the rod 28 includes a reduced threaded end 30 which is to be conducted through an opening 32 within a movable cutting blade 34. The opening 32 is irregularly shaped and conforms with a similarly shaped section 36 formed on the upper end of rod 28. A nut 38 is the threaded section 30 to secure the blade 34 against a fixed blade 40 which is mounted by conventional fasteners to a block 42 that is fixedly secured to the upper end of tubular member 22.

As is clearly depicted within FIGS. 1 and 3 of the drawings, the operator only need locate cutting edge of the fixed blade 40 directly adjacent the stem of a piece of fruit and by pivoting the rod 28 manually via actuating member 26, the movable blade 34 will move across the fixed blade 40 and thereby sever the stam 42 of the piece of fruit 44. The piece of fruit 44 is permitted to fall into guide member 46. The guide member 46 is tubular and is fixedly secured to the elongated member 22. The piece of fruit then falls through the guide member 46 and will normally pass through a flexible chute 48. The flexible chute 48 will normally be constructed of cheese cloth fabric or the like. The purpose of the chute 48 is to slow the movement of the fuit and to prevent bruising of the fruit as it is deposited from the chute 48 into a container (not shown).

Referring particularly to FIGS. 6–12 of the drawings, there is shown a second embodiment 50 of this invention which is basically composed of an elongated member 52, a cutting blade assembly 54 and an actuating member 56. The cutting blade assembly 54 is attached to the upper end of the elongated member 52 with the actuating member 56 being pivotly mounted adjacent the lower end of the member 52.

The actuating member 56 is to be manually operated and is connected to one end of a wire 58. The other end of the wire 58 is fixedly attached by a pin 60 to a substantially cylindrical shaped member 62. The back surface of the cylindrical shaped member 62 is pivotly attached by means of pivot pin 64 to the elongated member 52. A cutting blade 66 is fixedly secured to an outwardly extending section 67 of the elongated member 52. The outermost extremity of the outwardly extending section 67 includes a guide channel 68. The outwardly extending section 67 extends through a slot 70 located in the back or end wall 69 of the cylindrical shaped member 62. The length of the slot 70 defines the amount of pivotal movement permitted by the tubular member 62 with respect to the elongated member 52.

The cylindrical wall of the tubular member 62 rides within the channel shaped guide 68. This cylindrical wall includes a pear shaped opening 72. The apex 74 of the opening 72 includes a cutting edge.

A coil spring 78 is connected between a portion of the member 52 and the cylindrical wall 62. The function of the spring 78 is to exert a continuous bias on the cylindrical shaped member 62 so as to locate such in the non-cutting position which is shown in FIG. 7 of the drawings. The operator is then free to locate the piece of fruit through the opening 72. The operator then moves actuating lever 56 which causes the cylindrical shaped member 62 to rotate against the action of the spring 78. This rotational action causes the stem of the fruit to be cut due to the interaction between the blades 66 and 74.

At this time the cut fruit then will fall by gravity from the enlarged chamber within the tubular member 62 into a tubular guide member 80 which is fixedly secured to the member 52. Again the tubular guide member 80 will normally have attached thereto a flexible chute 82.

The main advantage of the second embodiment of this invention over the first embodiment is that the cutting blade arrangement is more protected so as to prevent the possibility of accidental injury to the user of the apparatus of this invention.

What is claimed is:

1. An apparatus for picking fruit from trees comprising:

an elongated member having an upper end and a lower end;
   actuation means mounted on said lower end of said member;
   cutting means mounted on said upper end of said member, said cutting means being movable to effect the cutting operation, said actuation means being connected to said cutting means, upon manual activation of said actuation means said cutting means being moved through the cutting operation;
   guide means mounted on said member directly adjacent said upper end and said cutting means, said guide means being tubular for conducting therethrough a piece of fruit in a particular direction after the stem of the fruit has been severed by said cutting means, said guide means including an elongated flexible walled chute for guiding and depositing the fruit in a container without bruising of the fruit;
   said cutting means includes a rotatable cylinder defining an interior chamber, said rotatable cylinder having a cylindrical wall, a cutting blade fixed to said upper end of said member and mounted within said interior chamber and located in close proximity of said cylindrical wall, a first opening formed within said cylindrical wall, a second opening formed within said cylindrical wall, a single piece of fruit to be inserted through said first opening and upon activation of said actuation means the cylindrical wall is moved across said fixed cutting blade to thereby sever the stem of the fruit and cause the fruit to fall freely within said interior chamber and out through said second opening and into said guide means; and
   spring biasing means connected between said elongated member and said rotatable cylinder, said spring biasing means exerting a continuous bias on said rotatable cylinder tending to locate said rotatable cylinder in a pre-cutting position.

* * * * *